United States Patent [19]

Hahn, Jr.

[11] Patent Number: 4,789,694

[45] Date of Patent: * Dec. 6, 1988

[54] AMBIENT CURE LATEX PAINT

[75] Inventor: Kenneth G. Hahn, Jr., Hinckley, Ohio

[73] Assignee: The Glidden Company, Cleveland, Ohio

[*] Notice: The portion of the term of this patent subsequent to Mar. 1, 2005 has been disclaimed.

[21] Appl. No.: 100,537

[22] Filed: Sep. 24, 1987

Related U.S. Application Data

[63] Continuation-in-part of Ser. No. 824,241, Jan. 30, 1986, abandoned, and a continuation-in-part of Ser. No. 943,794, Dec. 19, 1986.

[51] Int. Cl.$^4$ .......................... C08J 3/08; C08L 61/00
[52] U.S. Cl. ..................................... 523/310; 524/512
[58] Field of Search ........................ 523/310; 524/512

[56] References Cited

U.S. PATENT DOCUMENTS

| | | | |
|---|---|---|---|
| 3,022,260 | 2/1962 | Miller et al. | 523/310 |
| 3,048,556 | 8/1962 | Miller | 523/310 |
| 3,511,799 | 5/1970 | Clampitt | 523/310 |
| 3,577,375 | 5/1971 | Clampitt | 523/310 |
| 3,823,106 | 7/1974 | Kimura et al. | 523/310 |
| 3,989,649 | 11/1976 | Kaiho et al. | 523/310 |
| 4,012,351 | 3/1977 | Hall et al. | 524/106 |
| 4,369,266 | 1/1983 | Kuhls et al. | 523/310 |
| 4,442,247 | 4/1984 | Ishikura et al. | 524/512 |
| 4,442,248 | 4/1984 | Kanda et al. | 524/512 |
| 4,442,257 | 4/1984 | Borovicka, Sr. et al. | 524/555 |
| 4,444,941 | 4/1984 | Borovicka, Sr. et al. | 525/375 |
| 4,487,889 | 12/1984 | Craun | 524/512 |
| 4,512,860 | 4/1985 | Abbey et al. | 428/461 |
| 4,525,260 | 6/1985 | Abbey et al. | 524/555 |
| 4,525,535 | 6/1985 | Craun et al. | 524/512 |
| 4,540,735 | 9/1985 | Borovicka, Sr. | 524/512 |
| 4,542,180 | 9/1985 | Carlson et al. | 524/512 |

FOREIGN PATENT DOCUMENTS

| | | | |
|---|---|---|---|
| 1131013 | 6/1962 | Fed. Rep. of Germany | 523/310 |
| 3217564 | 11/1983 | Fed. Rep. of Germany | 523/310 |

*Primary Examiner*—Joseph L. Schofer
*Assistant Examiner*—N. Sarofim
*Attorney, Agent, or Firm*—Thomas M. Schmitz

[57] ABSTRACT

The paint coating composition comprises a cationic free, functional emulsion polymer mixture adapted to be coreacted at room temperature with glycoluril to provide a cured thermoset paint film. The process comprises copolymerizing ethylenically unsaturated monomers, including functional monomers, but excluding amine monomers, in an aqueous polymerization medium, followed by ion exchange of the resulting reactive emulsion polymer. Preferably, the glycoluril is processed through an ion exchange step separately or in conjunction with the reactive emulsion polymer. The resulting polymers are useful as binders in ambient cure surface coating application.

14 Claims, No Drawings

AMBIENT CURE LATEX PAINT

BACKGROUND OF THE INVENTION

This is a continuation-in-part of commonly assigned U.S. Ser. No. 824,241 filed Jan. 30, 1986, now abandoned, and Ser. No. 943,794, now pending, and the disclosures of said applications are incorporated herein by reference.

This invention pertains to pigmented ambient cure emulsion coatings treated by cation exchange where the emulsion polymers contain hydroxyl, methylol amide or carboxyl groups but are free of amine groups. The stable reactive coating is based on ion-exchange of a water dispersed mixture of glycoluril resin and acrylic emulsion polymer, where the emulsion polymer contains carboxyl and/or hydroxyl groups but is free of amine groups.

Prior to this invention, glycoluril cured thermosetting emulsions were produced from non-ionic and acidic surfactants and generally required high levels of such surfactants. Anionic salt surfactants cause a detriment to the curing reaction. Further, pigmentation of such glycoluril and emulsion mixtures caused undesirable flocculation during the pigment grind step and subsequent let-down to produce pigmented mixtures.

Prior art U.S. Pat. Nos. 4,442,257 and 4,444,941 teach the use of certain acrylic latexes crosslinked with either tetramethylol glycoluril (TMGU) or dihydroxy dimethylol ethylene urea (DDEU) for low-temperature curing coatings. Rapid cure is achieved with these products by adding from 1.5% to 3.5% by weight of a 40% solution of paratoluene sulfonic acid where a package pH of about 1.0 to 2.0 results. Stability of these catalyzed products ordinarily is limited to 1–5 days at room temperature, and much less at elevated temperatures. Hence, the acid catalyst must be added at the time of use, which can be dangerous since the acid is quite corrosive. Cured films of such polymer mixtures often exhibit certain water sensitivity due to residual catalyst in the cured films. Without the catalyst, however, the coating has no solvent or water resistance unless baked at extremely high temperatures.

Abbey (U.S. Pat. No. 4,525,260) discloses a cationic latex for cathodic electrocoating and specifically includes amine monomers. The reference latex is based on acrylic monomers copolymerized with amine monomers, such as N,N-dimethyl-2-aminoethyl methacrylate, and catalyzed with an azo catalyst. Abbey subsequently treats the cationic latex with an ion exchange resin but to specifically remove amino monomers and amino initiator fragments. Hence, the reference is specifically directed to removing amino fragments introduced in the emulsion process. As noted below, amine latexes are not operative in this invention in that amine groups block coreactivity with a glycoluril cross-linker and inhibit the cure.

It now has been found that ambient dry consumer trade sales latex paint compositions (wall and ceiling paints, etc.) can be formulated to produce highly desired air dry films which further cross-link over a period of time to produce substantially improved film integrity properties. Prior to this invention, conventional air dry consumer paints dried by evaporation of water and subsequent coalescence of binder polymer particles. However, such binders were merely coalesced but not crosslinked. In accordance with this invention, the binder polymer particles coalesce but then further crosslink at ambient room temperature upon the passage of several days to produce a substantially improved cross-linked film. Hence, excellent room temperature cured consumer paints can be produced to be soft enough to provide excellent film formation and will subsequently crosslink at ambient room temperature to form a cured thermoset paint film exhibiting superior film itegrity properties.

In accordance with this invention, an ambient cured latex paint containing glycoluril-type cross-linkers and coreactive binder polymers can be produced by using conventional surfactants, where the mixture is subsequently subjected to cationic exchange to remove the cations from the anionic surfactant as well as from other sources. The emulsion binder polymer specifically contains hydroxyl and/or carboxyl groups but not amine groups and provides an excellent thermosetting, ambient cure latex paint. Amine groups block reactivity, inhibiting cure and render the ionic exchange process of this invention inoperative. The resulting cationic exchange step produces a clear emulsion mixture adapted to cure at room temperature without the addition of acid catalysts such as p-toluenesulfonic acid, and hence, the disadvantages associated with the use of external acid catalysts are overcome by this invention. Dynamic mechanical analysis further demonstrates that the ambient cure achieved by ion exchange is faster than by acid catalysis. The pigmented or clear mixtures exhibit excellent uninhibited cure along with long-term viscosity stability. Accordingly, basic conventional surfactants used as the dispersant enables a dilatent free grind in producing the pigmented emulsion. Upon cation exchange treatment of the glycoluril and emulsion polymer dispersion, the mixture is stable against settling and exhibits no flocculation. In accordance with this invention, the ion-exchange process utilizes a proton-substituted cation exchange resin to remove cations rather than use detrimental external acid catalysts to effect the ambient crosslinking reaction. This process unexpectedly yields an ambient cure liquid coating with long-term package stability as compared with the acid-catalyzed liquid coating which reacts quickly but typically destabilizes and gels in 1–5days at room temperature. The improved clear or pigmented emulsion coatings of this invention are indefinitely stable at room temperature yet, upon drying, thermoset at room temperature to give a fully crosslinked film.

SUMMARY OF THE INVENTION

Briefly, the invention pertains to a stabilized clear or pigmented aqueous dispersion useful as an ambient or room temperature thermosetting latex paint which comprises, water, one or more acrylic or acrylic-modified binder latexes, and a crosslinking agent adapted to cure at ambient temperatures below about 35° C. with said binder latexes. The acrylic emulsion polymer contains hydroxyls or carboxyls but is free of amine groups. The composition is produced by first compounding the glycoluril and emulsion polymer dispersion and then treating the same with an ion exchange resin, preferably a cation exchange resin, individually or together, to provide coatings having superior storage stability and which cure without the addition of acid cure catalyst. The present invention provides a stable clear or pigmented coating which, when dried at room temperature or heated in a baking oven, reacts to form a crosslinked film with good performance properties.

DETAILED DESCRIPTION OF THE INVENTION

In accordance with this invention, a post ion-exchange treatment of aqueous dispersions of glycoluril and emulsion polymer is affected to remove cations from the dispersions. Post ion-exchange treatment is best effected with protonated cation exchange resin. Protonated cation exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%–100% by weight of the exchange resin to the coating with agitation and mixing until the pH has stabilized below 2.5, and typically around 1.2–1.8. The mixture can be strained through a filter medium such as linen cloth of a size small enough to remove all of the solid exchange resin, whereby the filtered coating exhibits minimal changes in pH or viscosity over 3 months or longer. Optionally, the coating can be passed over a column bed of the exchange resin at a rate which yields a coating pH of less than 2.5, preferably around 1.2–1.8. Again, little or no change in stability or in pH or viscosity is apparent over a 3-month period.

Referring to the reactive emulsion polymer, the reactive polymer contains reactive hydroxyl, carboxyl, or acrylamide groups, but is free of amine groups. The emulsion polymer comprises copolymerized ethylenically unsaturated monomers including at least about 2% copolymerized reactive monomers of acrylamide, carboxyl monomer, or hydroxyl monomer. The acrylamide monomers can be acrylamide, methacrylamide, ethyacrylamide; and similar alkyl acrylamide and methacrylamide monomers including for example, N-methylol acrylamide, N-ethanol acrylamide, N-propanol acrylamide, N-methylol methacrylamide, N-ethanol methacrylamide, and similar acrylamide and methacrylamide monomers. Carboxyl containing monomers are ethylenically unsaturated monomers containing carboxyl groups, including lower alkyl acrylate or methacrylate monomers such as acrylic, methacrylic, or ethacrylic acid. Other useful carboxyl reactants include itaconic, citriconic, fumaric, maleic, mesaconic and aconitric acids. The preferred acids are acrylic and methacrylic acids. Hydroxyl containing monomers are ethylenically unsaturated monomers containing a hydroxyl group and can include for example, hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Ethylenically unsaturated monomers other than acrylamide, carboxyl, and hydroxyl monomers can include vinyl unsaturated monomers containing vinyl double bond unsaturation including, for example, vinyl esters such as vinyl acetate, vinyl propionate, vinyl butyrates, vinyl benzoate, isopropenyl acetate and like vinyl esters; vinyl amides, such as acrylamide and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy catalyst, common redox catalyst, ultraviolet radiation, or the like.

Preferred latex binders for this invention are acrylic or modified acrylic binders such as set forth in U.S. Pat. No. 4,444,941 and U.S. Pat. No. 4,442,257, provided the emulsion polymer is free of amine groups. A preferred emulsion polymer free of amine groups preferably comprises by weight between 20% and 95% acrylate or methacrylate monomers, 0% and 20% functional monomer selected from a carboxyl monomer, a hydroxyl monomer, or acrylamide monomer, or mixtures of such functional monomers, and 0% to 50% other ethylenically unsaturated monomer. A preferred emulsion polymer comprises a latex polymer consisting of copolymerized monomers of 20%–50% methyl methacrylate, 0%–20% ethyl acrylate, 20%–50% butyl acrylate, and 1%–20% of a hydroxyl-bearing monomer.

The reactive emulsion polymer containing reactive hydroxyl, carboxyl, or acrylamide groups can be crosslinked by reaction with a glycoluril derivative. Glycoluril derivatives are disclosed in U.S. Pat. No. 4,064,191 and are also known as acetyleneureas. Glycolurils are derived by reacting two moles of urea with one mole of glyoxal to provide a complex ring structure as shown in U.S. Pat. No. 4,540,735; where substitute constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethyoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxyl ethylene urea (DDEU) which is believed to have the chemical structure as follows:

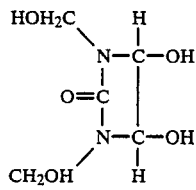

In practice, the ethylenic monomers can be polymerized in an aqueous medium at a pH preferably between about 1.0 and 6 to form a reactive emulsion polymer. Generally, the polymerization is conducted at a temperature of about 20°–100° C. in the presence of a free radical generating initiator. Commonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with a reducing substance such as a polyhydroxy phenol. The amount of initiator used will generally be in the range between about 0.1 to 3% by weight based on the monomers and preferably is maintained between 0.15 and 1% by weight of the monomers. Usually the initiator will all be charged at the outset of the polymerization; however, incremental addition or proportioning of the initiator is often employed.

Emulsifiers used to prepare the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanol-amine lauryl sulfate, ethylamide lauryl sulfate; alkyli metal and ammonium salts of sulfonated petroleum or paraffin oils, sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A coating is prepared by blending from about 20 to 95 parts of emulsion polymer with from about 5 to 80 parts of one of the aforementioned crosslinkers, preferably about 70 to 95 parts of emulsion polymer with about 5 to 30 parts of crosslinker. The polymeric mixture of this invention advantageously avoids the problems associated with prior art coatings catalyzed with 1–4% of 40% paratoluene sulfonic acid. Stability of such prior art mixtures was limited to about 1–5 days in the best of cases, and, with many latex blends agglomeration occured within seconds of catalysis.

In accordance with this invention, a very clear coating or uniform dispersion of pigments can be obtained, using conventional anionic and nonionic surfactants, whereupon cations are subsequently removed by batch exchanging with Amberlite 200 CH resin, lowering the pH to less than 2.0. This dispersion is stable and shows no flocculation when combined with ion-exchanged glycoluril or aminoplast. Accordingly, a stable dispersion can be made using conventional surfactants which subsequently can be acidified by cation exchange to provide compatibility and stability in let down steps and pigment grinds if desired. Conventional basic surfactant can be used as the dispersant to enable a dilatentfree pigment grind. Cation exchange prevents settling and flocculation and further prevents cure inhibition in the final paint.

In accordance with this invention, ambient dry consumer trade sales latex paint compositions (wall and ceiling paints, etc.) can be formulated to produce highly desired air dry films which further cross-link over a period of time to produce substantially improved film integrity properties. Prior to this invention, conventional air dry consumer paints dried by evaporation of water and subsequent coalescence of binder polymer particles. However, such binders were merely coalesced but not crosslinked. In accordance with this invention, the binder polymer particles coalesce but then further crosslink at ambient room temperature upon the passage of several days to produce a substantially improved film. The merits of this invention are further illustrated by the following examples.

EXAMPLE 1

A clear formulation based on a latex functional binder comprising copolymerized 39.1% butyl acrylate, 49.0% methyl methacrylate, 6% hydroxy ethyl acrylate, 1.9% methylol acrylamide, 4% methacrylic acid and Cymel 1172 (TMGU) along with appropriate additives was cation exchanged to a pH of 1.7. A sample of that material was coated with a 2-mil Bird applicator on sealed Leneta paper. The wet sample still showed a pH of 1.7. Temperature in the room was steady at 75° F.; relative humidity (RH) fluctuated around 26–30%. The dried film was tested and monitored by MEK and water rubs where N.D. means not determined.

| Elapsed Time | MEK Rubs | Water Rubs |
| --- | --- | --- |
| 2.5 hrs. | 20–25 | 135 |
| 4 hrs. | 39 | 200 soften |
| 20 hrs. | 70 | 200 sl. soften |
| 24 hrs. | 75 | N.D. |
| 7 days | 75 | 200 no effect |
| 14 days | 135 | N.D. |

This demonstrates that very good solvent resistance and reasonable water resistance can be obtained in only a day at room temperature.

The same clear coating was applied to Leneta paper with a 2-mil Bird applicator (1.3–1.5 mils dry film measured) and the panels were immediately put into a refrigerator at 40° F., 28% RH while still wet. Within 1 hour the films had coalesced. Cure was monitored as before.

| Elapsed Time | MEK Rubs | Water Rubs |
| --- | --- | --- |
| 2 hrs. | 5 | N.D. |
| 5 days | 15 | 52 |
| 6 days | 19 | 80 |

At this time the panels were removed and left in the open room and further tested (75° F., 22% RH).

| 1.25 hrs. | 20 | 200 soften |
| --- | --- | --- |
| 2.25 hrs. | 49 | N.D. |
| 3.75 hrs. | 46 | 200-no soften |
| 5.5 hrs. | 55 | N.D. |
| 24 hrs. | 104 | 200-no soften |

This demonstrates that the cure proceeds slowly at 40° F., but accelerates when warmed up. This indicates that consumer trade sales coatings can be applied at low temperatures to develop some cure, and when the area later warmed up the crosslinking reaction would proceed quickly to completion.

The same coating was tested to better characterize cure at these low temperatures. A temperature gradient plate (commonly called an MFT bar) was used. It has 5 grooves about 1 inch wide and several mils thick cut into the surface linearly across a temperature range from about 4° C. to about 45° C. Dry air constantly sweeps across the surface. Temperature probes indicate the temperature at 7 locations across the gradient.

All 5 grooves were filled with the clear coating used in this Example. Water and MEK rubs were measured at different temperatures on one groove each ½ hour.

| Elapsed Time | MEK/WATER RUBS @ TEMP., DEGREES C. | | | | | | |
| --- | --- | --- | --- | --- | --- | --- | --- |
| | 4 C. | 9 C. | 16 C. | 22 C. | 28 C. | 34 C. | 43 C. |
| 0.5 hr | 5/8 | 17/18 | 20/30 | 44/200+ | 80/200+ | 85/200+ | 97/200+ |
| 1 hr | 9/8 | 26/20 | 60/168 | 83/200+ | 100+/ND | 100+/ND | 100+/ND |
| 1.5 hr | 17/15 | 38/200+ | 85/ND | 100+/ND | 100+/ND | 100+/ND | 100+/ND |
| 2 hr | 20/30 | 57/170 | 100+/ND | 100+/ND | 100+/ND | 100+/ND | 100+/ND |
| 2.5 hr. | 30/50 | 100+/200+ | 100+/ND | 100+/ND | 100+/ND | 100+/ND | 100+/ND |

This demonstrates that the degree of cross-linking cure is temperature dependent, but some cure occurs even at 4° C.

In a similar manner, a white pigmented coating was prepared and cation exchanged to a pH of 1.8. A baked sample was first tested to show that full cure gave about 25 MEK rubs from a 2 mil Bird-applied film. Ambient cures were checked as follows.

| Elapsed Time | MEK Rubs | Water Rubs |
| --- | --- | --- |
| 0.5 hr | 6 | 7 |
| 15.5 hr | 15 | 200 soften |
| 21.25 hr | 23 | 200 no soften |
| 24 hr | 20 | N.D. |

| Elapsed Time | MEK Rubs | Water Rubs |
| --- | --- | --- |
| 10 days | 23-28 | N.D. |

Overnight the pH of the wet paint sample drifted to 2.3 due to the presence of some acid-soluble cations not removed in the exchange process. Part of the sample was cation reexchanged to a pH of 1.9. Both were coated and tested for ambient cure

| | pH 1.9 | | pH 2.3 | |
| --- | --- | --- | --- | --- |
| Elapsed Time | MEK Rubs | Water Rubs | MEK Rubs | Water Rubs |
| 0.5 hrs | 5 | 5 | 5 | 4 |
| 1 hr | 8 | 11 | 4 | 5 |
| 4 hrs | 12 | 35 | 7 | 11 |
| 7 hrs | 12 | 200 soften | 7 | 22 |
| 6 days | 20 | N.D. | 23 | 200 |
| 9 days | 22-24 | N.D. | 17-21 | N.D. |

This indicates that although the pH drifted slightly upward, the resulting cured films were essentially the same demonstrating the favorable effect of the original ion exchange step.

EXAMPLE 2

Samples of three latexes were mixed with Cymel 1175 (American Cyanamid) (DDEU) at 80:20 latex:1175. Portions of each were set aside for testing. The remainder of each was combined with Amberlite 200CH cation exchange resin and mixed until the pH had stabilized below 1.8. All were allowed to mix overnight before testing.

Latex compositions:

| | A | B | C |
| --- | --- | --- | --- |
| Butyl acrylate | 39.1% | 50.5% | 57.8% |
| Methyl methacrylate | 49% | 37.6% | 30.3% |
| Hydroxyethyl acrylate | 6% | 6% | 6% |
| nMethylol acrylamide | 1.9% | 1.9% | 1.9% |
| Methacrylic acid | 4% | 4% | 4% |
| Tg | 16° C. | 0° C. | −10° C. |

Testing:

Each clear coating was applied by 3 mil Bird coater to cleaned glass plates and allowed to dry on the bench top. Temperature was about 72 F., and relative humidity was about 50%. Pencil hardness and MEK resistance were noted from time to time. Control for the study was a commonly-used acrylic copolymer (AC-388) latex from Rohm and Haas Corp.

| Test Sample | 3 hours | 24 hours | 48 hours | 11 days |
| --- | --- | --- | --- | --- |
| A/1175 (not ion exchanged) | <5B 61 MEK | <5B | | |

-continued

| Test Sample | 3 hours | 24 hours | 48 hours | 11 days |
|---|---|---|---|---|
| A/1175 (ion exchanged) | F >400 MEK | HB-F >400 MEK | | |
| B/1175 (not ion exchanged) | <5B 20 MEK Sticky | <5B Sticky | <5B Sticky | <5B 20-25 MEK Sticky |
| B/1175 (ion exchanged) | 3B >400 MEK Not sticky | 3B 400 MEK Not sticky | 3B 400 MEK Not sticky | 3B 400 MEK Not sticky |
| C/1175 (not ion exchanged) | <5B 15-20 MEK Very sticky | <5B Very sticky | <5B Very sticky | <5B 20-25 MEK Very sticky |
| C/1175 (ion exchanged) | 3B >400 MEK Not sticky | 3B 400 MEK Not sticky | 3B 400 MEK Not sticky | 3B 400 MEK Not sticky |
| AC-388 latex | <5B | <5B | 5B | |

This work clearly indicates that soft latex will form a film without external coalescent, and through room temperature crosslinking will develop more hardness than would be encountered with a typical trade sales latex.

The foregoing illustrates the merits of this invention, but is not intended to be limiting except by the appended claims.

I claim:

1. In a process for producing an ambient dry paint coating composition, including the step of producing an emulsion polymer binder by copolymerizing ethylenically unsaturated monomers in an aqueous polymerization medium, and in the presence of surfactants and initiators, the improvement comprising:
   copolymerizing ethylenically unsaturated monomers, including carboxyl or hydroxyl functional monomers, but excluding amine monomers, to produce a functionally reactive emulsion polymer adapted to be coreactive with a glycoluril derivative;
   treating the functional emulsion polymer by contact with an ion exchange resin to remove cations from the functional emulsion polymer and produce a pH of less than 2.5, where said functionally reactive emulsion polymer is coreactive and adapted to crosslink with glycoluril derivative at ambient temperatures upon application to a substrate to produce a thermoset paint coating film.

2. The process in claim 1 where the glycol derivative is metholated glycoluril resin.

3. The process in claim 1 wherein the reactive emulsion polymer is mixed with a glycoluril derivative prior to the step of treating with an ion exchange resin.

4. The process of claim 1 wherein the ion exchange resin is a protonated cation exchange resin.

5. The process of claim 1 wherein the glycoluril derivative is treated separately with an ion exchange resin and thereafter mixed with the functionally reactive emulsion polymer treated with the ion exchange resin.

6. The process in claim 1 where the coating is adapted to cure as a thermoset paint film by coalescence of the functionally reactive emulsion polymer and by cross-linking between the reactive emulsion polymer and glycoluril derivative.

7. The process of claim 1 wherein the coating composition comprises a functionally reactive acrylic latex binder and the glycoluril is a methylolated glycoluril containing between 1 and 4 methylol groups.

8. The process of claim 1 wherein the glycoluril derivative comprises dihydroxy dimethyol ethylene urea.

9. An ambient cure paint coating composition wherein the resin components comprise a binder substantially free of cations comprising by weight between 20% and 95% functionally reactive emulsion polymer and between 5% and 80% glycoluril derivative, with pigment comprising between about 0% and 75% by weight based on the binder plus pigment, said reactive emulsion polymer containing reactive hydroxy, carboxyl, or acrylamide groups adapted to be coreactive with said glycoluril derivative, where said reactive emulsion polymer is free of amine groups, said composition produced by treating said reactive emulsion polymer and said glycoluril derivative by contact with ion exchange resin to substantially remove the cations from the emulsion polymer and the glycoluril derivative to produce a pH of less than 2.5, where the paint coating composition is adapted to thermoset at ambient temperatures upon application as a film to a substrate.

10. The coating composition in claim 9 where the coating cures by coalescence of the reactive emulsion polymer and by cross-linking between the reactive emulsion polymer and the glycoluril derivative at ambient temperatures.

11. The paint coating composition in claim 9 where the functionally reactive emulsion polymer comprises an acrylic latex.

12. The paint composition in claim 9 where the glycoluril derivative is a methylolated glycoluril derivative.

13. The paint coating composition in claim 8 where the glycoluril derivative is a methyloxated glycoluril containing between 1 and 4 methylol groups.

14. The paint coating composition in claim 8 where glycoluril derivative comprises dihydroxy dimethylol ethylene urea.

* * * * *